US010725799B2

(12) United States Patent
Zusman et al.

(10) Patent No.: US 10,725,799 B2
(45) Date of Patent: Jul. 28, 2020

(54) BIG DATA PIPELINE MANAGEMENT WITHIN SPREADSHEET APPLICATIONS

(71) Applicant: Microsoft Technology Licensing, LLC, Redmond, WA (US)

(72) Inventors: Dmitry Zusman, Redmond, WA (US); Aleksandr Malyshev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 15/439,452

(22) Filed: Feb. 22, 2017

(65) Prior Publication Data

US 2018/0239617 A1    Aug. 23, 2018

(51) Int. Cl.
```
G06F 3/048      (2013.01)
G06F 9/451      (2018.01)
G06F 9/48       (2006.01)
G06F 9/54       (2006.01)
G06F 16/25      (2019.01)
H04L 29/08      (2006.01)
```
(52) U.S. Cl.
CPC ............ *G06F 9/452* (2018.02); *G06F 9/4843* (2013.01); *G06F 9/544* (2013.01); *G06F 16/258* (2019.01); *H04L 67/10* (2013.01)

(58) Field of Classification Search
CPC ...... G06F 9/452; G06F 16/258; G06F 9/4843; G06F 9/544
USPC ........................................................ 715/738
See application file for complete search history.

(56) References Cited

U.S. PATENT DOCUMENTS

| | | | |
|---|---|---|---|
| 5,893,123 A | 4/1999 | Tuinenga | |
| 6,460,059 B1 * | 10/2002 | Wisniewski | G06F 17/246 715/205 |
| 6,988,241 B1 | 1/2006 | Guttman et al. | |
| 7,324,991 B1 * | 1/2008 | Anjur | G06F 16/2462 |
| 7,908,549 B2 | 3/2011 | Khen et al. | |
| 8,082,489 B2 * | 12/2011 | Jiang | G06F 17/2247 715/212 |
| 8,190,987 B2 | 5/2012 | Campbell et al. | |

(Continued)

OTHER PUBLICATIONS

"Final Office Action Issued in U.S. Appl. No. 15/439,341", dated Dec. 13, 2018, 13 Pages.

(Continued)

*Primary Examiner* — David Phantana-angkool (57) ABSTRACT

The techniques described herein facilitate asynchronous management of external or Big Data processing pipelines from within client-side (or local) spreadsheet applications, e.g., Microsoft Excel®. In an implementation, a method of operating a spreadsheet application service to facilitate management of big data pipelines from within a client-side spreadsheet application is disclosed. The method includes receiving a processing request initiated by a spreadsheet application. The processing request includes instructions for generating one or more big data pipelines between one or more external distributed computing systems. The method further includes translating the instruction into one or more scripts corresponding to the one or more external distributed computing systems, and executing the one or more scripts to direct the one or more external distributed computing systems to automatically generate the big data pipelines.

20 Claims, 10 Drawing Sheets

(56) References Cited

U.S. PATENT DOCUMENTS

| | | | |
|---|---|---|---|
| 8,250,117 B2 | 8/2012 | Olivieri et al. | |
| 8,370,770 B2* | 2/2013 | Vance | G06F 3/04817 |
| | | | 715/834 |
| 8,447,886 B2* | 5/2013 | Rochelle | G06F 17/246 |
| | | | 709/248 |
| 8,527,865 B2 | 9/2013 | Li et al. | |
| 8,584,004 B2 | 11/2013 | Rae et al. | |
| 8,626,477 B2* | 1/2014 | Oh | G06F 8/35 |
| | | | 703/6 |
| 8,627,120 B2 | 1/2014 | Conway | |
| 9,389,891 B2 | 7/2016 | Battagin et al. | |
| 9,794,328 B1* | 10/2017 | Corley | G06F 21/62 |
| 10,013,412 B2* | 7/2018 | McKenzie | G06F 17/246 |
| 10,311,105 B2* | 6/2019 | Nice | G06F 16/90335 |
| 10,366,102 B2* | 7/2019 | Dageville | G06F 16/2365 |
| 10,540,330 B1* | 1/2020 | Tiwari | G06F 16/2453 |
| 2004/0181748 A1 | 9/2004 | Jamshidi et al. | |
| 2006/0036939 A1 | 2/2006 | Hobbs et al. | |
| 2006/0080594 A1* | 4/2006 | Chavoustie | G06F 17/246 |
| | | | 715/218 |
| 2008/0027920 A1* | 1/2008 | Schipunov | G06F 16/2471 |
| 2009/0006939 A1 | 1/2009 | DeSpain et al. | |
| 2010/0057831 A1 | 3/2010 | Williamson | |
| 2010/0306128 A1* | 12/2010 | Moffat | G06Q 40/06 |
| | | | 705/36 R |
| 2013/0073940 A1 | 3/2013 | Honsowetz | |
| 2013/0151938 A1 | 6/2013 | Waldman et al. | |
| 2013/0179764 A1* | 7/2013 | Battagin | G06F 17/246 |
| | | | 715/209 |
| 2013/0254644 A1 | 9/2013 | Rochelle et al. | |
| 2014/0172955 A1 | 6/2014 | Holla P K et al. | |
| 2014/0244707 A1 | 8/2014 | Kluin et al. | |
| 2015/0199326 A1 | 7/2015 | Danziger et al. | |
| 2015/0269273 A1* | 9/2015 | Vorne | H04L 29/08846 |
| | | | 715/234 |
| 2017/0177173 A1* | 6/2017 | Doms | G06F 16/2272 |
| 2018/0239617 A1* | 8/2018 | Zusman | G06F 9/45512 |
| 2018/0239749 A1 | 8/2018 | Zusman et al. | |

OTHER PUBLICATIONS

"Non Final Office Action issued in U.S. Appl. No. 15/439,341", dated Feb. 28, 2018, 12 Pages.

"Analyzing Big SQL data in a client spreadsheet application", http://www.ibm.com/support/knowledgecenter/SSPT3X_2.1.2/com.ibm.swg.im.infosphere.biginsights.tut.doc/doc/tut_less_bigsql_excel.html, Retrieved on: Dec. 8, 2016, 3 pages.

"A Better Calculation Engine: Leveraging Excel Logic for Server Side Calculations", In White Paper, Nov. 3, 2005, 5 pages.

"Excel 2010 Performance: Performance and Limit Improvements", https://msdn.microsoft.com/en-us/library/office/ff700514(v=office.14).aspx, Published on: Nov. 12, 2012, 5 pages.

Pinola, Melanie, "Speed Up Excel by Turning Off Calculations (and Other Tricks)", http://lifehacker.com/5811745/speed-up-excel-by-turning-off-calculations-and-other-tricks, Published on: Jun. 14, 2011, 2 pages.

"Non Final Office Action Issued in U.S. Appl. No. 15/439,341", dated Jul. 29, 2019, 13 Pages.

"Final Office Action Issued in U.S. Appl. No. 15/439,341", dated Dec. 31, 2019, 14 Pages.

* cited by examiner

BIG DATA PIPELINE MANAGEMENT WITHIN SPREADSHEET APPLICATIONS

CROSS-REFERENCE TO RELATED APPLICATIONS

This application is related to co-pending U.S. patent application Ser. No. 15/439,341, entitled "TECHNIQUES FOR ASYNCHRONOUS EXECUTION OF COMPUTATIONALLY EXPENSIVE LOCAL SPREADSHEET TASKS," which was filed on the same day as this application, the contents of which are expressly incorporated by reference herein.

BACKGROUND

Spreadsheet applications such as, for example, Microsoft Excel®, are widely used in many fields and are increasingly important for analyzing data in today's business environments. For example, data analysts regularly use client-side (or local) spreadsheet applications as a tool for performing computationally expensive spreadsheet tasks including, but not limited to, consolidating and massaging data, producing charts, performing complex calculations, and the like.

However, as the spreadsheet tasks become increasingly complex, and as the amount of data grows, the calculations become increasing expensive to execute in terms of calculation time, power consumption, and rendering for user observation. For example, client-side spreadsheet applications can be limited in the number or rows (or volume) of data that can be processed. Moreover, the data must be processed synchronously which results in a variety of inefficiencies including exceedingly long wait times, lost calculation data, timeouts, etc., among other inefficiencies.

External Big Data frameworks can be utilized, in conjunction with client-side spreadsheet applications, to process and analyze large datasets. Typically, scripts are developed and executed to create external data pipelines between the external Big Data systems, e.g., Cosmos, Hadoop, SQL, etc. The scripts can, for example, direct the external Big Data systems to aggregate datasets, perform one or more processes on the datasets, and/or move the processed data to a temporary storage location where results can be exported to the client-side spreadsheet application. Unfortunately, there is currently no way to control the external pipelines without writing individualized scripts for each external Big Data system. This process is time consuming, burdensome, and synchronous, e.g., once the process is kicked off by a computer, it must be finished on that computer.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to external processing (or Big Data) pipeline management within client-side spreadsheet applications, e.g., Microsoft Excel®. In an implementation, a method of operating a spreadsheet application service to facilitate management of external processing pipelines from within client-side spreadsheet applications is disclosed. The method includes receiving a processing request initiated by a spreadsheet application. The processing request includes instructions for generating one or more external processing pipelines between one or more external distributed computing systems. The method further includes translating the instruction into one or more scripts corresponding to the one or more external distributed computing systems, and executing the one or more scripts to direct the one or more external distributed computing systems to automatically generate the big data pipelines.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

Techniques are described for asynchronously facilitating management of Big Data pipelines from within client-side spreadsheet applications. More specifically, the techniques describe automating data processing on external back-end Big Data systems via a client-side (or local) spreadsheet application. Advantageously, datasets need not originate in the client-side workbook. Rather, a user can kick off a complex data processing flow including one or more external processing (or Big Data) pipelines via a spreadsheet application user interface, have the processing pipelines execute, and asynchronously integrate or otherwise render the output or results in a worksheet or workbook.

At least one technical effect enabled by the techniques discussed herein is the ability for a user to open a workbook and initiate the remote processing feature on one client device and continue to work or consume the results—at a later time—using the same or a different client device. In this manner, the client devices can automate remote processing pipelines without concern for synchronicity, e.g., calculation time, timeouts, etc. The calculation and resulting visualization thereof are asynchronous. Additionally, scripts for each external Big Data or computing system are automatically generated and need not be individually maintained.

Figure 1:
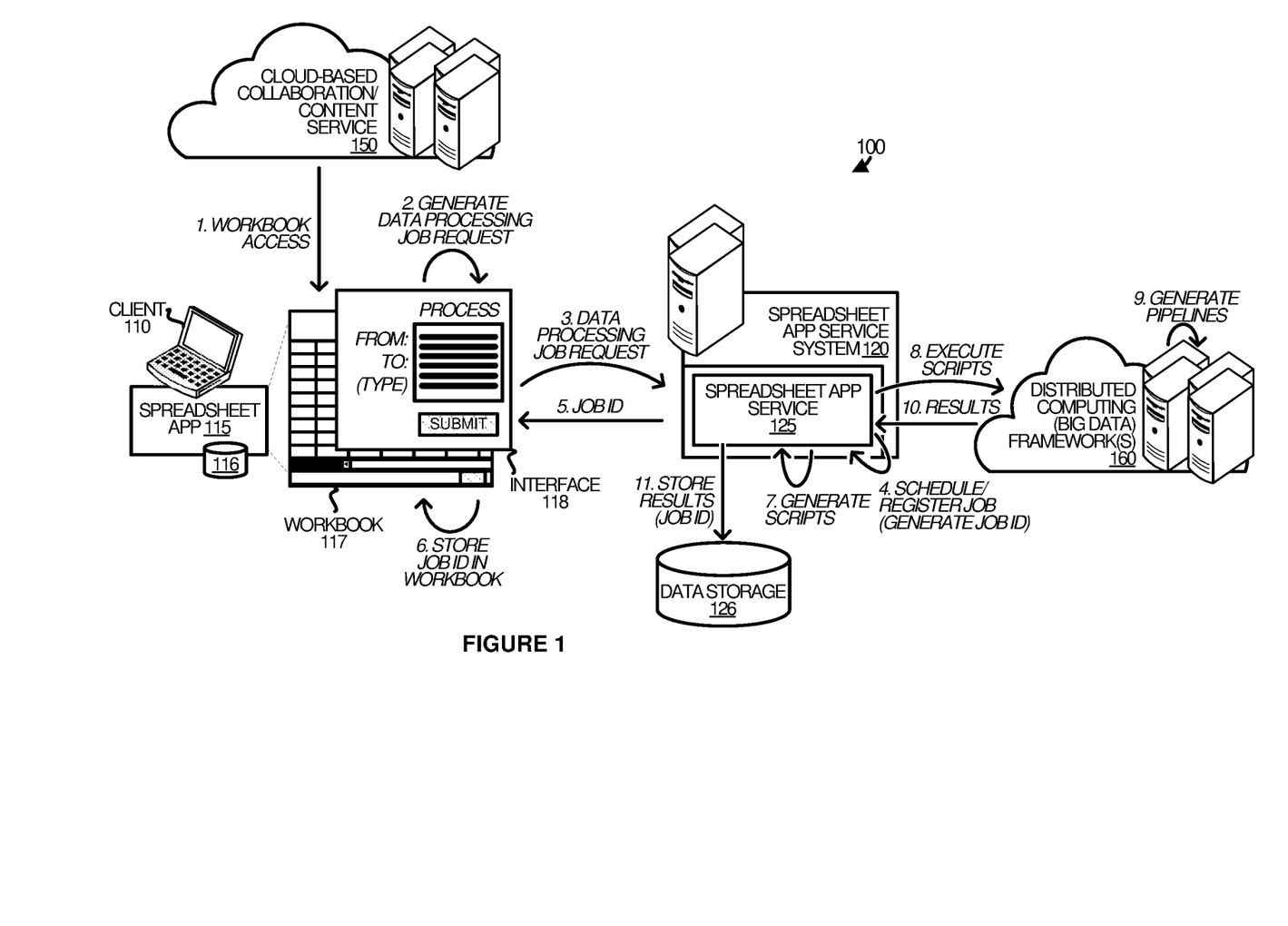
FIG. 1 depicts a block diagram illustrating an example operational architecture for asynchronously directing a spreadsheet application service to execute computationally expensive spreadsheet tasks, according to some embodiments.

FIG. 1 depicts a block diagram illustrating an example operational architecture 100 for facilitating management of Big Data (or external processing) pipelines from within a spreadsheet application 115, according to some embodiments. The example operational architecture 100 includes a client device 110, a spreadsheet application service system 120 including data storage 126, a content service 150, and one or more distributed computing (Big Data) frameworks 160. As shown in the example of FIG. 1, the spreadsheet application service system 120 executes a spreadsheet app service 125.

Figure 7:
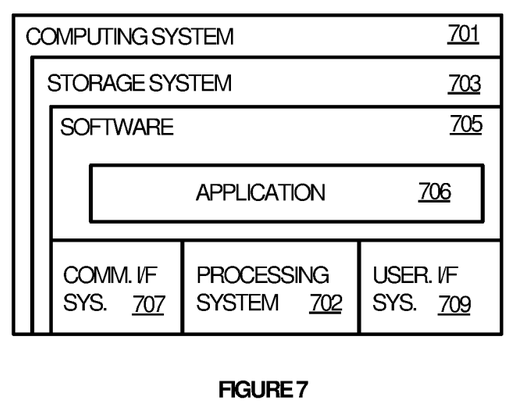
FIG. 7 is a block diagram illustrating a computing system suitable for implementing the electronic calendar sharing technology disclosed herein, including any of the applications, architectures, elements, processes, and operational scenarios and sequences illustrated in the Figures and discussed below in the Technical Disclosure.

In operation, client device 110 runs a spreadsheet application 115 that, at step 1, accesses a workbook 117 from a collaboration or content service 150. The collaboration or content service 150 is representative of any service providing shared access to cloud-based or centralized content and centralized storage for workbooks such as, for example, Microsoft® SharePoint® Online (SPO) services, SharePoint®, a shared network drive, or the like. As shown in the example of FIG. 1, workbook 117 is opened on client device 110 with spreadsheet app 115. The spreadsheet app 115 can include functionality including GUIs (graphical user interface) running on client 110, e.g., a PC, mobile phone device, a Web server, or other application servers. Such systems may employ one or more virtual machines, containers, or any other type of virtual computing resource in the context of supporting the offloading of computationally expensive spreadsheet tasks of which computing system 701 of FIG. 7 is representative.

As shown in the example of FIG. 1, the spreadsheet app 115 includes interface 118. At step 2, a user can generate a processing request via interface 118. The interface 118 allows a user to provide processing instructions that can include various data processing steps for generating one or more big data pipelines between one or more external distributed computing systems. The instructions can include, among other information, a location of a dataset, one or more processes to execute on the dataset, and a location to publish output (or results) of the big data pipelines. In some embodiments, each processing step can include a source location, e.g., 'FROM' field, a destination location, e.g., 'TO' field, and a 'PROCESS' or 'TYPE' fields. Once the instructions are entered, a user can submit the data processing request, e.g., via a submit button.

Responsive to triggering submission of a data processing job request, at step 3, the spreadsheet app 115 can generate the data processing job request and send the request to spreadsheet app service 125 running on the spreadsheet application service system 120. The spreadsheet application service system 120 may include server computers, blade servers, rack servers, and any other type of computing system (or collection thereof) suitable for executing the spreadsheet app service 125 and/or otherwise carrying out the operations discussed herein. Such systems may employ one or more virtual machines, containers, or any other type of virtual computing resource in the context of supporting execution of offloaded computationally expensive spreadsheet tasks of which computing system 701 of FIG. 7 is representative.

The spreadsheet app service 125 receives the data processing job request and, at step 4, schedules or registers the job request with a job registry component of the spreadsheet application service. In some embodiments, registering the job request with the job registry component includes generating a job ID that is persistently associated with the job or the job request. At step 5, the spreadsheet app service 125 provides the persistent job ID to spreadsheet application 115 which, at step 6, in turn, stores the job ID in workbook 117. For example, the spreadsheet application 115 or an extension thereof may store or embed the job ID in one or more spreadsheets of workbook 117.

At step 7, the spreadsheet app service 125 generates one or more scripts corresponding to one or more of the external distributed computing (Big Data) frameworks 160. More specifically, the spreadsheet app service 125 identifies the one or more external distributed computing systems and then translates the instructions into one or more scripts corresponding to the one external distributed computing (Big Data) frameworks 160

At step 8, the spreadsheet app service 125 executes the one or more scripts to direct the one or more external distributed computing (Big Data) frameworks 160 to automatically generate the big data pipelines. As discussed herein, the scripts may further direct the one or more external distributed computing (Big Data) frameworks 160 to execute one or more processes on a dataset. The external distributed computing (Big Data) frameworks 160 can be any cloud-based or central processing systems capable of storing data from the one or more spreadsheets and an instruction directing the spreadsheet application service to asynchronously execute the computationally expensive spreadsheet task. Example external distributed computing (Big Data) frameworks 160 include, but are not limited to, Structured Query Language (SQL) database systems, Apache Hive™ systems, Microsoft Cosmos™ systems, R systems, Spark systems, Yarn system, Mesos systems and OLAP systems.

Figure 6A:
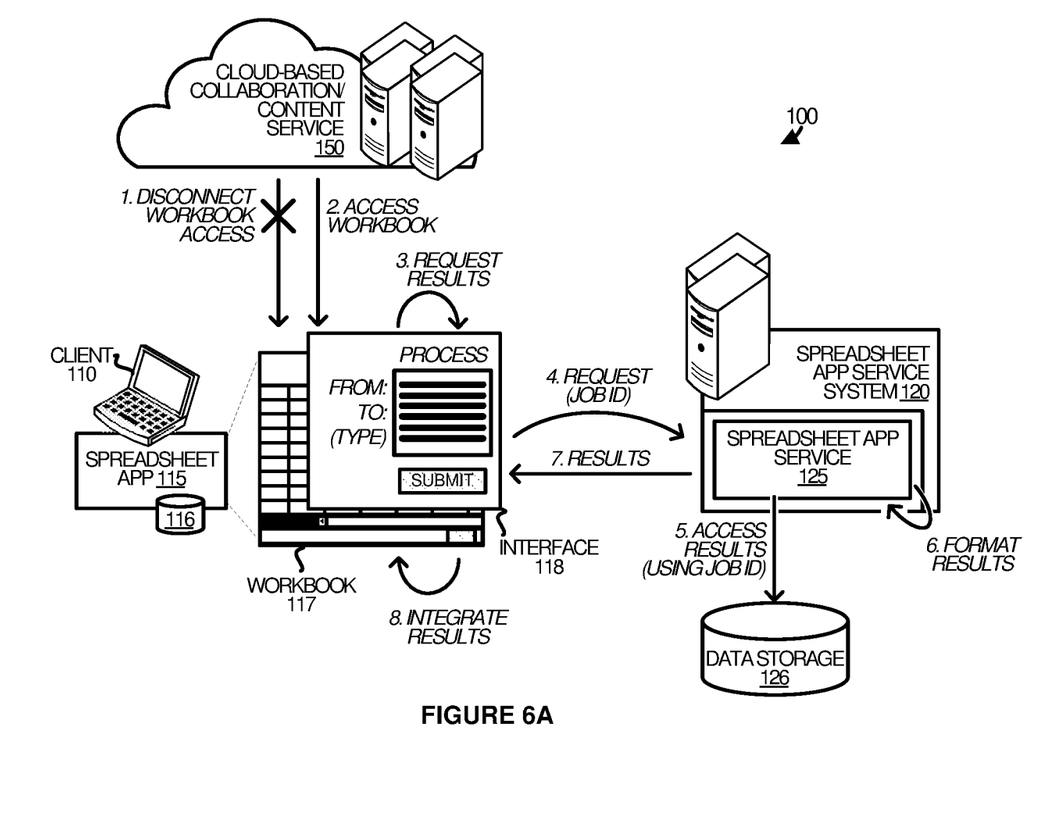
FIGS. 6A-6C depict block diagrams illustrating example operational architectures for requesting results of a computationally expensive spreadsheet task from various spreadsheet applications, according to some embodiments.
Figure 6B:
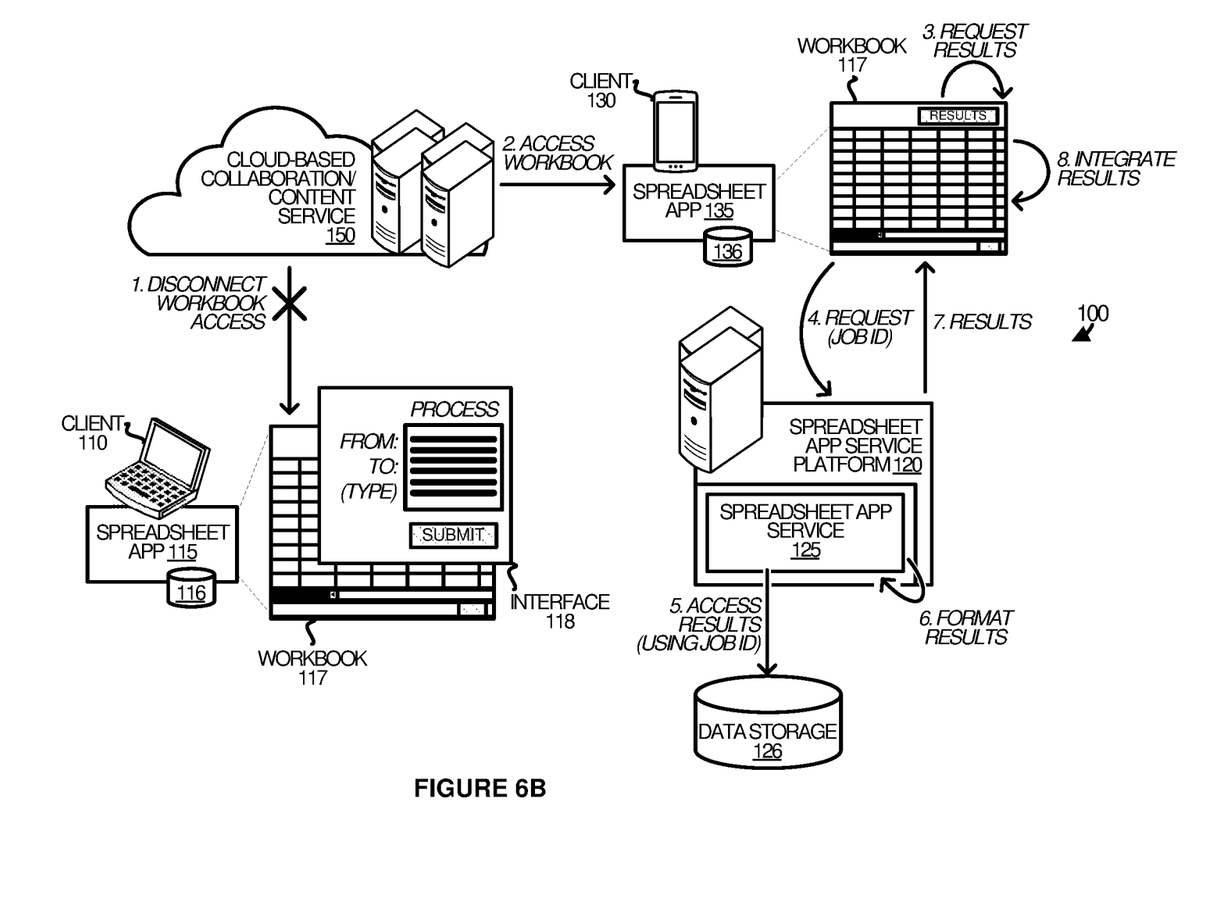
Figure 6C:
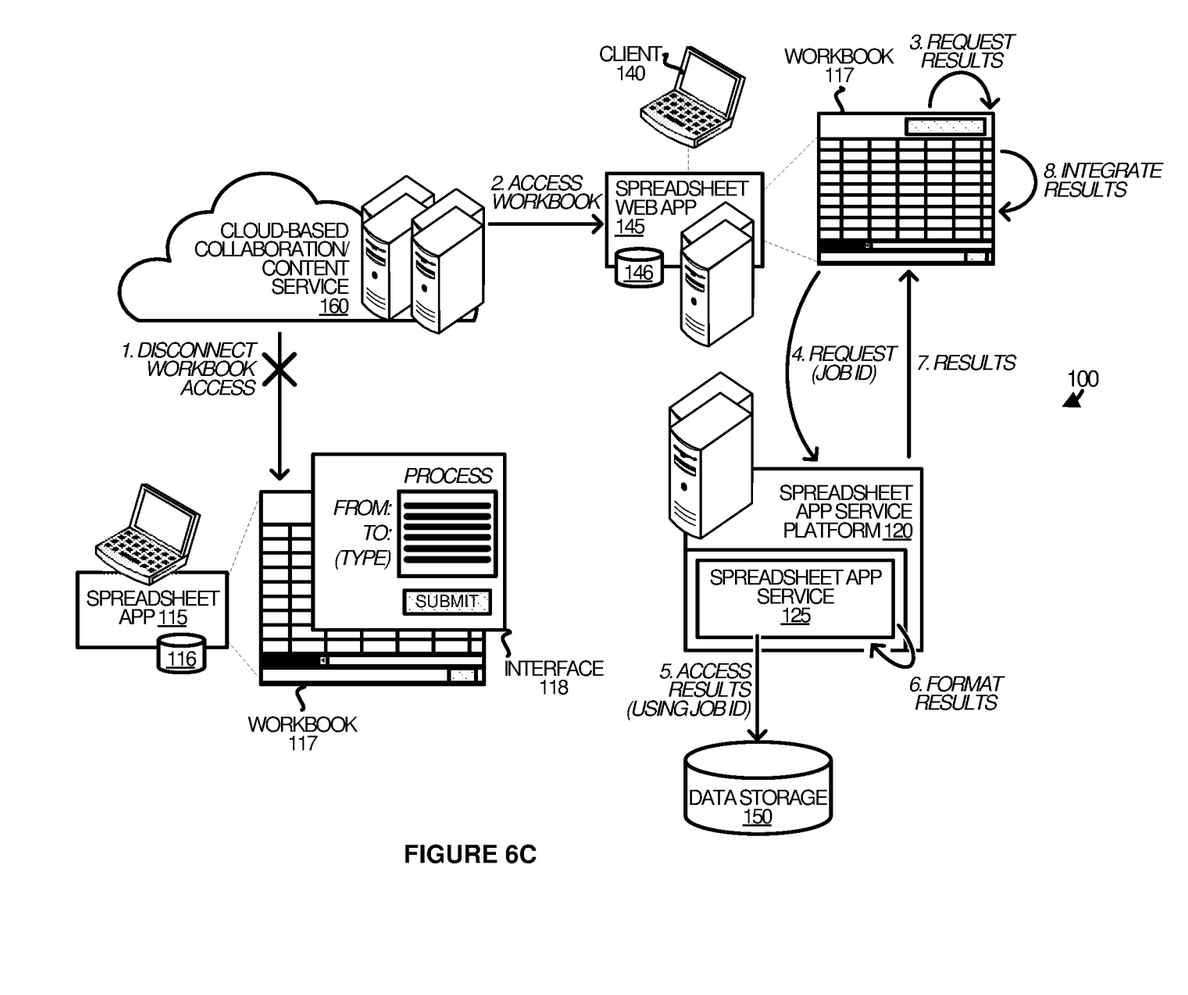

The external distributed computing (Big Data) frameworks 160, at step 9, generate the big data pipelines between one another and/or execute one or more processes on a dataset stored in one or more of the external distributed computing (Big Data) frameworks 160. The scripts can include a location to publish output of the big data pipelines. For example, the results or output can be persisted in one or more temporary tables of the spreadsheet app service 125, e.g., within data storage 126. Alternatively or additionally, the results or output can be temporarily stored in one or more of the external distributed computing (Big Data) frameworks 160, e.g., and SQL database for importing to the spreadsheet app service 125 and/or the spreadsheet app 115 directly. As shown in the example of FIG. 1, the results are received by spreadsheet app service 125 at step 10, and, at step 11, temporarily stored in association with the Job ID for asynchronous access by a local spreadsheet app, e.g., spready app 115. FIGS. 6A-6C illustrate various operational architectures for requesting the results from different spreadsheet applications.

Figure 2:
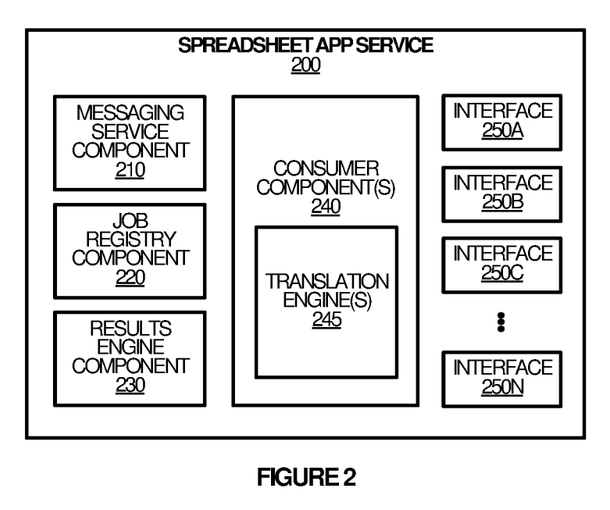
FIG. 2 depicts a block diagram illustrating example components of a spreadsheet application service, in accordance with some embodiments.

FIG. 2 depicts a block diagram illustrating example components of a spreadsheet application service 200, in accordance with some embodiments. Spreadsheet application service 200 can be spreadsheet app service 125 of FIG. 1, although alternative configurations are possible. As illustrated in the example of FIG. 2, the spreadsheet application service 200 includes a messaging service component 210, a job registry component 220, a results engine component 230, one or more consumer components 240, and interfaces 250A-N. Some or all the components can be omitted in some embodiments. Additional components are also possible.

The messaging service component 210 is configured to interface with the client-side spreadsheet applications. For example, the messaging service component 210 receives and processes data processing job requests initiated by client-side spreadsheet applications. The job requests are processed to identify instructions for generating one or more external processing pipelines between one or more external distributed computing systems. For example, in some embodiments, the messaging service component 210 extracts the instructions from the data processing job requests.

The job registry component 220 is configured to register the processing job requests and responsively generate a unique job identifier (ID) that is persistently associated with a corresponding processing job request. The results engine component 230 is configured to generate one or more data structures, e.g., tables for temporarily storing results or output of the one or more external processing pipelines between one or more external distributed computing systems.

The one or more consumer components are configured to consume the job requests and translate the job requests into one or more scripts corresponding to the one or more external distributed computing systems. In some embodiments, each consumer component can include one or more translation engines each corresponding to external distributed computing systems. The interfaces 250A-250N can interface with the external distributed computing systems. For example, each interface 250A-250N can comprise an Application Program Interfaces (API) for an external distributed computing system.

Figure 3:
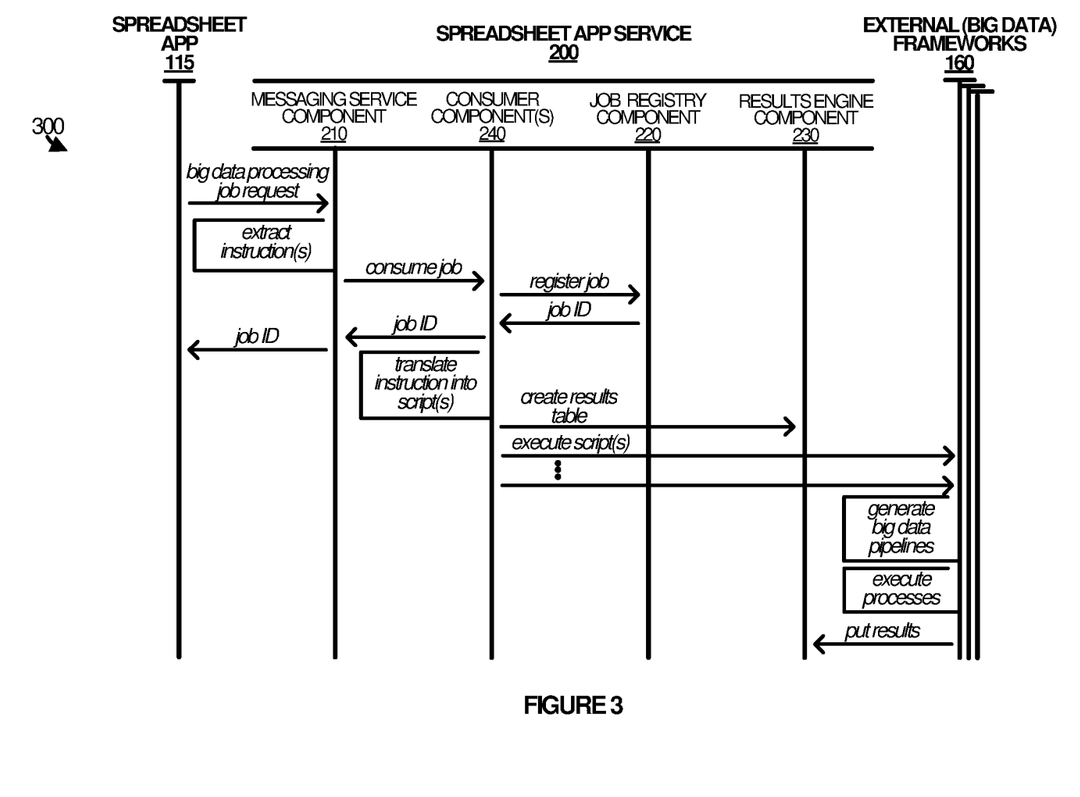
FIG. 3 depicts a sequence diagram illustrating example operations of components spreadsheet application service within example operational architecture, according to some embodiments.

To further illustrate operation of example operational architecture 100, FIG. 3 is provided. More specifically, the example of FIG. 3 includes a spreadsheet application service in the form of spreadsheet application service 200 of FIG. 2.

FIG. 3 depicts a sequence diagram 300 illustrating example operations of components of spreadsheet application service 200 within example operational architecture 100, according to some embodiments. As shown in the example of FIG. 3, sequence diagram 300 includes a client-side spreadsheet app, e.g., spreadsheet app 115, various components a spreadsheet app service, e.g., spreadsheet app service 200, and external distributed computing (Big Data) frameworks 160. As shown, the spreadsheet app service 200 includes messaging component 210, one or more consumer components 240, a job registry component 220, and a results engine component 230. Interfaces to each external distributed computing (Big Data) frameworks 160 such as, for example, interfaces 250A-250N are omitted but, as discussed above, facilitate communication with individual ones of the external distributed computing (Big Data) frameworks 160.

To begin, the spreadsheet app 115 generates and sends a data processing request to the spreadsheet app service 200. The data processing request includes instructions for generating one or more big data pipelines between one or more external distributed computing systems. As discussed herein, the big data pipelines can include one or more processes that are executed by one or more of the distributed computing (Big Data) frameworks 160. The data processing request is received by messaging component 210 which processes the request to identify distributed computing (Big Data) frameworks 160 indicated in the instructions. For example, as shown and discussed in greater detail with reference to FIGS. 4A and 4B, the instructions can identify the systems between which pipelines should be created and one or more processes that are to be executed by those systems.

The one or more consumer components 240 consume the job and register the job with a job registration component 220. The job registration component 220 generates a unique job ID corresponding to the job and provides the job ID back to the spreadsheet app 115 so that the big data pipelines can be managed (and the processes contained therein performed) asynchronously from the perspective of the client-side spreadsheet application. As shown, the job ID is provided by way of the one or more consumer components 240 and messaging component 210. However, the job ID can also be provided directly to the spreadsheet app 115.

The one or more consumer components 240 translate the instructions into one or more scripts corresponding to one or more external distributed computing systems. The one or more consumer components 240 direct the results engine component 230 to generate a data structure for receiving output of the big data pipelines. As shown in the example of FIG. 3, the data structure comprises one or more tables, however, other data structures are also possible.

The consumer components 240 execute the one or more scripts to direct the one or more external distributed computing systems to automatically generate the big data pipelines and perform the one or more processes identified in the instructions. Once the big data pipelines and processes are executed, results or output of the big data pipelines are received from the last pipeline and stored or persisted in the data structure, e.g., one or more results tables. As discussed in more detail with reference to FIGS. 6A-6C, the results can be asynchronously accessed from various local spreadsheet applications using the persistent job ID.

Figure 4A:
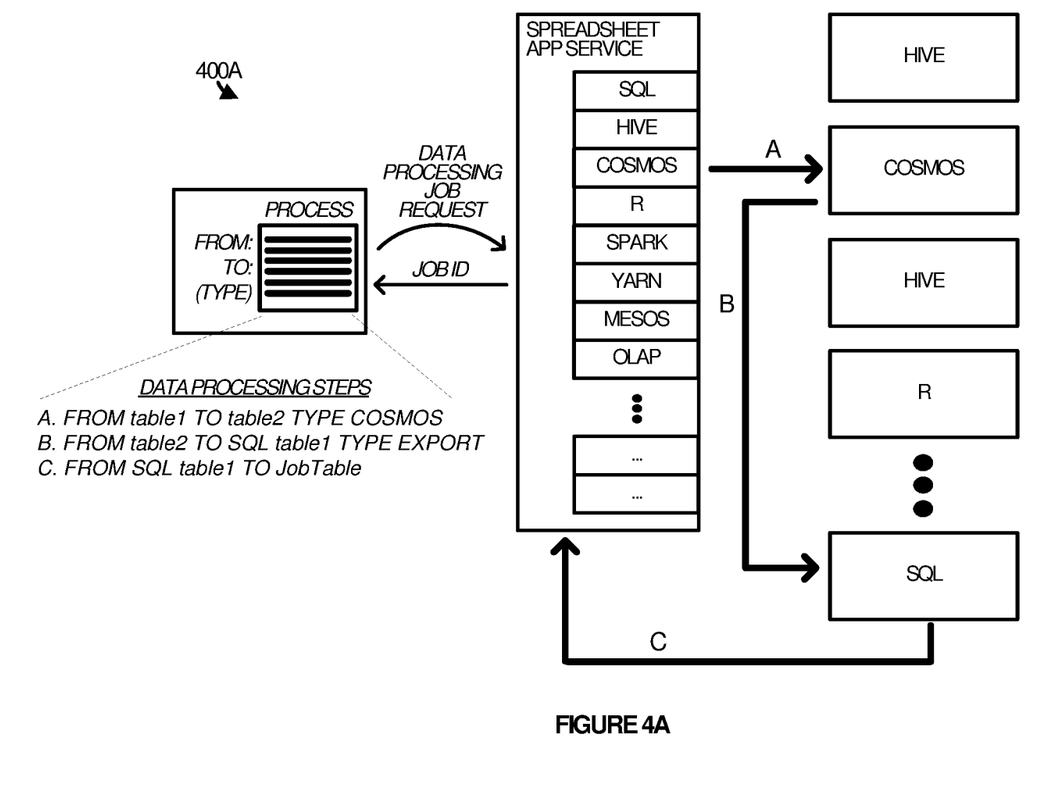
FIGS. 4A and 4B depict block diagrams illustrating example operational architectures for facilitating management of big data pipelines from within a spreadsheet application, according to some embodiments.
Figure 4B:
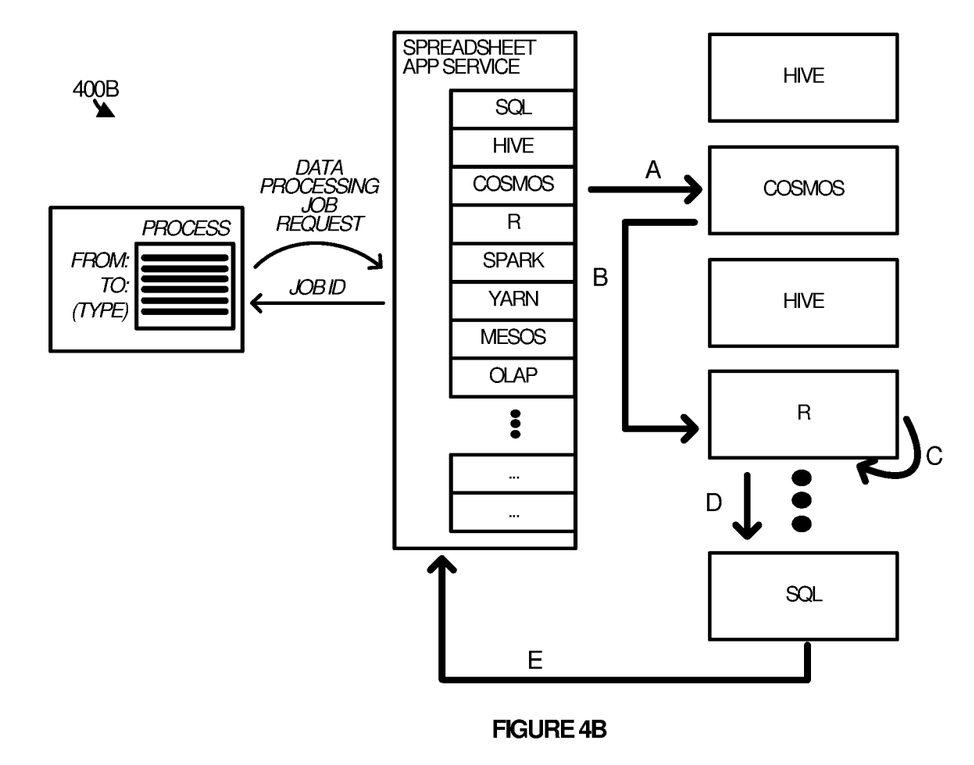

FIGS. 4A and 4B depict block diagrams illustrating example operational architectures 400A and 400B for facilitating management of big data pipelines from within a spreadsheet application, according to some embodiments. Example operational architectures 400A and 400B include an interface deployed from a local spreadsheet application that is configured to generate and send a data processing job requests to a spreadsheet application service. The interface can be interface 118 of FIG. 1 and the spreadsheet application service can be spreadsheet app service 125 of FIG. 1, although alternative configurations are possible.

Referring first to FIG. 4A, the interface is shown including data processing steps (or instructions) for directing generation of various Big Data pipelines A, B and C. As shown, the instructions include a location of a dataset, one or more processes to execute on the dataset, and a location to publish output of the big data pipelines. More specifically, each processing step can include a source location, e.g., 'FROM' field, a destination location, e.g., 'TO' field, and a 'PROCESS' or 'TYPE' fields.

The first example processing step 'FROM table1 TO table2 TYPE COSMOS' provides a location of the initial data, where to put the data and a type, e.g., COSMOS. In some embodiments, each step can indicate generation of a new data pipeline. A second example processing step 'FROM table2 TO SQL table1 TYPE EXPORT' illustrates a pipeline B being generated from a Cosmos framework to a specific table in an SQL framework. Lastly, the third processing step 'FROM SQL table1 TO JobTable' illustrates a pipeline C generated to put results (or output) of the data pipelines into a table associated with the job ID for temporary storage within the spreadsheet app service. FIG. 4B provides another example illustrating generation of pipelines A-E. As shown, pipelines can be processing steps within a framework, e.g., data pipeline C.

Figure 5:
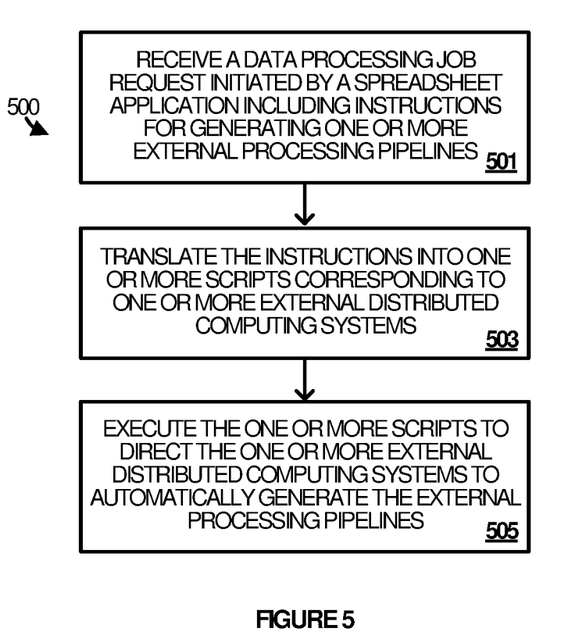
FIG. 5 depicts a flow diagram illustrating example operations of a spreadsheet application service for facilitating asynchronous management of external processing (or Big Data) pipelines from within client-side spreadsheet applications, according to some embodiments.

FIG. 5 depicts a flow diagram illustrating example operations 500 of a spreadsheet application service for facilitating asynchronous management of external processing (or Big Data) pipelines from within client-side spreadsheet applications, according to some embodiments. The example operations 500 may be performed in various embodiments by a spreadsheet app service such as, for example, spreadsheet app service 125 of FIG. 1, or one or more processors, extensions, modules, engines, components or tools associated therewith.

To begin, at 501, the spreadsheet application service receives a data processing job request initiated by a client-side spreadsheet application. The data processing job request includes instructions for generating one or more external processing pipelines between one or more external distributed computing systems. As discussed herein, the instructions can further include a location of a dataset, one or more processes to execute on the dataset, and a location to publish output of the external processing pipelines.

At 503, the spreadsheet application service translates the instructions into one or more scripts corresponding to the one or more external distributed computing systems. In addition to creating the one or more external processing pipelines between one or more external distributed computing systems, the one or more scripts can direct the one or more external distributed computing systems to execute the one or more processes on the dataset. In some embodiments, translating the instruction into one or more scripts corresponding to the one or more external distributed computing systems includes parsing the instruction to identify one or more processing steps. As discussed herein, each processing step can include a source data location, a destination data location, and a type field. Additionally, each processing step can include one or more processes to execute on a dataset.

Lastly, at 505, the spreadsheet application service executes the one or more scripts to direct the one or more external distributed computing systems to automatically generate the external processing pipelines.

FIGS. 6A-6C depict block diagrams illustrating example operational architectures 600A-600C for requesting results or output of a data processing job request from various spreadsheet applications, according to some embodiments. Example operational architectures 600A-600C are similar to example operational architecture 100 of FIG. 1 and include many of the same components. More specifically, example operational architectures 600A-600C provide a continuation of operations after a job ID has been stored in workbook 117, as shown and discussed with respect to FIG. 1. As discussed herein, the process of storing a job ID in the workbook 117 facilitates asynchronous requests including asynchronous management of the Big Data pipelines.

Initially, the example operational architectures 600A-600C illustrate disconnecting workbook access to workbook 117 after sending a data processing job request and subsequently requesting results of the request via various spreadsheet apps, including the same spreadsheet app 115 (FIG. 6A), a mobile spreadsheet app 135 (FIG. 6B), and a spreadsheet web app 145 (FIG. 6C). As discussed herein, any user with access to workbook 117 can generate and send a data processing job request from an interface of workbook 117, shutdown the spreadsheet application and subsequently access the results from the same or a different spreadsheet application. Likewise, a different user with access to workbook 117 can access the results from the same or a different spreadsheet application.

Referring first to FIG. 6A, initially, client device 110 runs a spreadsheet application 115 that accesses a workbook 117 from a collaboration or content service 150. As shown in the example of FIG. 1, workbook 117 is initially opened on client device 110 with spreadsheet app 115 and a data processing job request is sent for asynchronous performance.

At step 1, access to workbook 117 is disconnected. At step 2, a user of client 110 subsequently accesses workbook 117 again from spreadsheet app 115 running on client 110. Although not shown, the spreadsheet app 115 can monitor and/or otherwise receive status updates regarding execution of the data processing job request. At step 3, spreadsheet app 115 can generate and send a request for results of the computationally expensive spreadsheet task. The request includes the persistent job ID which can be extracted and/or otherwise obtained from workbook 117—where it was previously embedded. Although the example of FIG. 6A illustrates disconnection and reconnection, it is appreciated that spreadsheet app 115 can maintain the connection to workbook 117 and subsequently request results once available.

The spreadsheet app service 125 receives the request and, at step 5, accesses the results from a data storage system or database 126. At step 6, the spreadsheet app service 125 formats the results. In some embodiments, the type of client requesting the results or the type of spreadsheet application requesting the results can be identified based on the request. For example, the request can include an indication that the request is coming from a desktop, mobile or web application. The spreadsheet app service 125 can format the results based on the type of client requesting the results (or the type of spreadsheet application requesting the results). In some embodiments, formatting the results can include paging the results of the data processing job request, e.g., for a mobile spreadsheet app.

The spreadsheet app service 125, at step 7, provides the results of the data processing job request to the requesting spreadsheet application and, at step 8, the results are integrated into the workbook 117.

FIG. 6B is similar to the example of FIG. 6A, initially, client device 110 runs a spreadsheet application 115 that accesses a workbook 117 from a collaboration or content service 150 and a data processing job request is sent. At step 2, a user of mobile client 130 subsequently accesses workbook 117 from a mobile spreadsheet app 135 running on mobile client 130. Although not shown, the mobile spreadsheet app 135 can monitor and/or otherwise receive status updates regarding execution of the data processing job request. At step 3, the mobile spreadsheet app 135 can generate and send a request for results of the data processing job request. The request includes the persistent job ID which can be extracted and/or otherwise obtained from workbook 117—where it was previously embedded. Although the example of FIG. 6B illustrates disconnection of workbook 117, it is appreciated that spreadsheet app 115 can maintain the connection to workbook 117 concurrently with mobile spreadsheet app 135.

FIG. 6C is similar to the examples of FIGS. 6A and 6B, initially, client device 110 runs a spreadsheet web app 145 that accesses a workbook 117 from a collaboration or content service 150 and a data processing job request is sent to the spreadsheet app service 125. At step 2, a user of client 140 subsequently accesses workbook 117 from spreadsheet web app 145. Although not shown, the spreadsheet web app 145 can monitor and/or otherwise receive status updates regarding execution of the data processing job request. At step 3, the spreadsheet web app 145 can generate and send a request for results of the computationally expensive spreadsheet task. The request includes the persistent job ID which can be extracted and/or otherwise obtained from workbook 117—where it was previously embedded. Although the example of FIG. 6C illustrates disconnection of workbook 117, it is appreciated that spreadsheet app 115 can maintain the connection to workbook 117 concurrently with mobile spreadsheet app 135.

FIG. 7 illustrates computing system 701, which is representative of any system or collection of systems in which the various applications, services, scenarios, and processes disclosed herein may be implemented. For example, computing system 701 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and an optional user interface system 709.

Processing system 702 loads and executes software 705 from storage system 703. When executed by processing system 702 for deployment of scope-based certificates in multi-tenant cloud-based content and collaboration environments, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for directing the system to perform the processes described with reference to FIGS. 2-5.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or application software. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system. Indeed, encoding software on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. In some cases, the user interface system 709 may be omitted when the computing system 701 is implemented as one or more server computers such as, for example, blade servers, rack servers, or any other type of computing server system (or collection thereof).

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A device-implemented method of operating a spreadsheet application service to facilitate asynchronous management of processing pipelines external to a system implementing the device-implemented method and a client device executing a client-side spreadsheet applications, the device-implemented method comprising:
   receiving, from the client device, a data processing job request including an instructions that identifies external processing pipelines between
      the client-side spreadsheet application and a distributed computing systems external to both the system implementing the device-implemented method and the client device, and
      the distributed computing system and a location where output of the external processing pipelines is configured to be published;
   translating the instruction into a script
      that is compatible with the distributed computing system, and
      includes a second instruction configured to direct the distributed computing system to automatically generate the external processing pipelines; and
   communicating the script to the distributed computing system.

2. The device-implemented method of claim 1, wherein the instruction indicates a location of a dataset, a process to execute on the dataset, and the location to publish the output of the external processing pipelines.

3. The device-implemented method of claim 2, wherein the script further directs the distributed computing system to execute the process on the dataset.

4. The device-implemented method of claim 2, further comprising:
   generating a data structure for receiving the output of the external processing pipelines; and
   temporarily persisting the output in the data structure.

5. The device-implemented method of claim 2, further comprising:
   receiving, from a client device executing a requesting spreadsheet application, a request for the output of the external processing pipelines,
      wherein the request includes a job identifier (ID);

accessing the output of the external processing pipelines using the job ID; and providing, to the client device executing the requesting spreadsheet application, the output of the external processing pipelines to the requesting spreadsheet application.

6. The device-implemented method of claim 1, further comprising:

registering the data processing job request with a job registry component; and generating a job identifier (ID).

7. The device-implemented method of claim 6, further comprising:

persisting the job ID in association with the data processing job request; and providing the job ID to a remote spreadsheet application.

8. The device-implemented method of claim 1, wherein translating the instruction comprises:

parsing the instruction to identify a processing step including a source data location, a destination data location, and a type field.

9. The device-implemented method of claim 8, wherein the processing step further includes a process to execute on a dataset.

10. A spreadsheet application system comprising:

one or more processors;

one or more computer readable storage media; and a spreadsheet application service stored on the one or more computer readable storage media, the spreadsheet application service including program instructions that, when executed by the one or more processors, direct the one or more processors to at least:

identify, by processing a data processing job request received from a client device executing a client-side spreadsheet application, an instructions that identifies external processing pipelines between the client-side spreadsheet application, a distributed computing system external to the spreadsheet application system and the client device, and a location where output of the external processing pipelines is configured to be published;

translate the instruction into a script that is compatible with the distributed computing system; and execute the script including directing the distributed computing systems to automatically generate the external processing pipelines.

11. The spreadsheet application system of claim 10, wherein the instruction indicates a location of a dataset, one or more processes to execute on the dataset, and the location to publish output of the external processing pipelines.

12. The spreadsheet application system of claim 11, wherein executing the script further includes directing the distributed computing systems to execute the one or more processes on the dataset.

13. The spreadsheet application system of claim 11, wherein the program instructions, when executed by the one or more processors, further direct the one or more processors to:

generate a data structure for receiving the output of the external processing pipelines; and temporarily persist the output in the data structure.

14. The spreadsheet application system of claim 11, wherein the program instructions, when executed by the one or more processors, further direct the one or more processors to:

process a request for the output of the external processing pipelines received from a requesting spreadsheet application, wherein the request includes a job identifier (ID);

access the output of the external processing pipelines using the job ID; and provide the output of the external processing pipelines to the requesting spreadsheet application.

15. The spreadsheet application system of claim 10, wherein the program instructions, when executed by the one or more processors, further direct the one or more processors to:

register the data processing job request with a job registry component; and generate a job identifier (ID).

16. The spreadsheet application system of claim 15, wherein the program instructions, when executed by the one or more processors, further direct the one or more processors to:

persist the job ID in association with the data processing job request; and provide the job ID to a remote spreadsheet application.

17. The spreadsheet application system of claim 11, wherein to translate the instruction into a script, the program instructions, when executed by the one or more processors, further direct the one or more processors to:

parse the instruction to identify one or more processing steps, wherein each processing step includes a source data location, a destination data location, and a type field, and wherein each processing step further includes one or more processes to execute on a dataset.

18. A spreadsheet application service comprising:

a messaging service component configured to process a data processing job request received from a client-side spreadsheet applications and responsively identify an instruction that identifies external processing pipelines between the client-side spreadsheet application, an external distributed computing system, and a location where output of the external processing pipelines is configured to be published;

a consumer component configured to translate the data processing job request into a script corresponding to the external distributed computing system; and an interface configured to execute the script including directing the external distributed computing systems to automatically generate the external processing pipelines.

19. The spreadsheet application service of claim 18, wherein to translate the data processing request into the script, the consumer component is further configured to parse the instruction to identify one or more processing steps, wherein each processing job step includes a source data location, a destination data location, and a type field.

20. The spreadsheet application service of claim 19, wherein each processing step further includes one or more processes to execute on a dataset.

* * * * *